Patented Aug. 11, 1931

1,818,025

UNITED STATES PATENT OFFICE

ARTHUR WOLFRAM AND EMIL HAUSDÖRFER, OF FRANKFORT-ON-THE-MAIN-HOCHST, GERMANY, ASSIGNORS TO GENERAL ANILINE WORKS, INC., OF NEW YORK, N. Y., A CORPORATION OF NEW YORK

ANTHRACENE DERIVATIVES AND PROCESS OF PREPARING THEM

No Drawing. Application filed December 22, 1928, Serial No. 328,066, and in Germany December 30, 1927.

Our present invention relates to new anthracene derivatives and to a process of preparing them, more particularly it relates to compounds of the general formula:

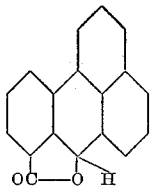

wherein the benzanthrone nucleus may be further substituted.

The new compounds are obtainable by treating a compound of the general formula:

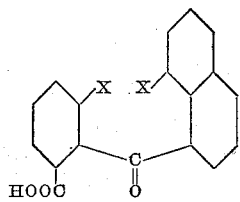

wherein X represents hydrogen and wherein the aromatic nuclei may be substituted, with an acid condensing agent such as aluminium chloride preferably in the presence of a melting agent such as trichlorobenzene or sodium chloride at an elevated temperature, more particularly at a temperature of from about 80° C. to about 120° C. The use of a considerably higher temperature than 120° C. is to be avoided inasmuch as at a temperature of, for instance, 150° C. undesirable secondary reactions, especially the formation of naphthanthraquinone derivatives, take place.

Our process may be carried out in an indifferent gas atmosphere.

Probably an intramolecular transposition occurs in the 2-(α-naphthoyl)-benzoic acid and water is split off with formation of a derivative of dihydrobenzanthrone according to the following equation:

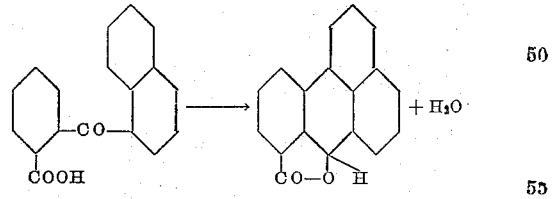

Our new products crystallize in the form of generally colorless needles and are not capable of forming vats with alkaline hydrosulfite solutions. They may be transformed into valuable vat dyestuffs by treating them with a caustic alkali.

The following examples illustrate our invention but they are not intended to limit it thereto, the parts being by weight.

(1) 240 parts of aluminium chloride and 60 parts of sodium chloride are fused in a nitrogen atmosphere at about 90° C. 27.6 parts of 2-(α-naphthoyl)-benzoic acid are then introduced into the fused mass which is stirred at about 100° C. until unaltered 2-(α-naphthoyl)-benzoic acid can no longer be detected in test samples. The melt is then decomposed with ice and water and the residue is extracted by boiling with diluted hydrochloric acid. In order to remove the napththanthraquinone which may have been formed the product is treated in the presence of a dilute caustic soda solution with hydrosulfite at a temperature of about 40° C.

The residue is a grayish-green substance which is purified by recrystallizing it from toluene. Thus almost colorless needles are obtained melting at 177° C. and dissolving in concentrated sulfuric acid to a pure yellow solution showing a green fluorescence. The compound is insoluble in aqueous alkalis even in the heat and incapable of forming a vat by the addition of hydrosulfite.

When using instead of the free 2-(α-naphthoyl)-benzoic acid the sodium salt thereof, the above described product is likewise obtained.

(2) 120 parts of finely powdered aluminium chloride are suspended in 150 parts of trichlorobenzene while introducing 27.6 parts of 2-(α-naphthoyl)-benzoic acid. The mass is then fused in an atmosphere of nitrogen at a temperature of about 100° C., as indicated in the preceding example, until unaltered 2-(α-naphthoyl)-benzoic acid can no longer be detected in test samples. The melt is then decomposed with ice and water. After the trichlorobenzene has been expelled with water-vapor, the residue is treated in the presence of a dilute caustic soda solution with hydrosulfite at a temperature of from 40° C. to 45° C. for the purpose of removing the small quantity of naphthanthraquinone. Thus a substance is obtained which is identical with that described in Example 1.

(3) 240 parts of aluminium chloride are fused with 60 parts of sodium chloride at a temperature of about 90° C. 29 parts of 2-(1′,4′-methylnaphthoyl)-benzoic acid are then introduced into the resulting fused mass which is stirred at about 110° C. until unaltered 2-(1′,4′-methylnaphthoyl)-benzoic acid can no longer be detected in test samples taken from the said mass. The melt is decomposed with ice and water and the residue is boiled out with dilute hydrochloric acid. 2-methyl-naphthanthraquinone which may have been formed is treated with sodium hydrosulfite at a temperature of about 40° C.

The light-yellow crude product thus obtained is readily soluble in alcohol, ether and other usual solvents. It is purified by recrystallizing it from ether or hexahydrobenzene. In this manner almost colorless laminæ are obtained melting at 138° C. and dissolving in concentrated sulfuric acid to a light-yellow solution with a feebly green fluorescence.

(4) 1 part of the condensation product obtained from 2-(α-napthoyl)-benzoic acid in the manner described in Example 1 is introduced into 6 parts of molten caustic potash at a temperature of about 230° C. While continuously stirring the fused mass the temperature is raised to 250° C. to 260° C. At this temperature the fused mass is stirred until a test sample dissolved in water does no longer show an increase of the formation of the dyestuff. The molten mass is then dissolved in water, heated after the addition of hydrosulfite and filtered hot. On blowing air into the filtrate the dyestuff precipitates in the form of fine violet blue flakes which are filtered by suction, washed and dried. The dyestuff forms a violet-black powder. Its vat has a reddish-violet coloration and shows an intensely red fluorescence. It dyes the vegetable fibre a violet tint. After exposure to the air blue dyeings are obtained. The dyestuff dissolves in sulfuric acid to a violet-blue coloration.

We claim:

1. The process, which comprises treating a compound of the following formula:

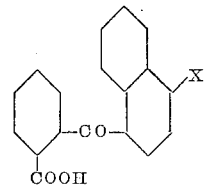

wherein X stands for hydrogen or methyl, with aluminium chloride in the presence of a melting agent at a temperture of about from 80° C. to 120° C.

2. The process, which comprises treating a compound of the following formula:

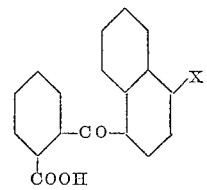

wherein X stands for hydrogen or methyl, in an alkali-aluminium chloride melt at a temperature of about from 90° C. to 110° C.

3. The process, which comprises treating a compound of the following formula:

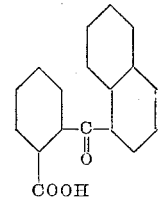

with aluminium chloride in the presence of a melting agent at a temperature of about from 80° C. to 120° C.

4. The process, which comprises treating a compound of the following formula:

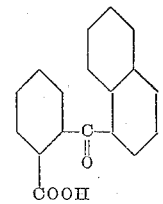

in an alkali-aluminium chloride melt at a temperature of about 90° C.

5. The process, which comprises treating a compound of the following formula:

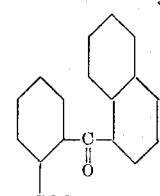

with aluminium chloride in the presence of a melting agent at a temperature of about from 80° C. to 120° C. and further condensing the so formed condensation product in a melt of a caustic alkali at a temperature of about from 230° C. to 260° C.

6. The process, which comprises treating a compound of the following formula:

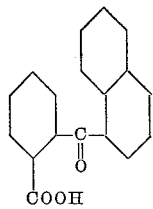
COOH in an alkali-aluminium chloride melt at a temperature of about 90° C. and further condensing the so formed condensation product in a melt of a caustic alkali at a temperature of about from 230° C. to 260° C.

7. As new products, the compounds of the following probable formula:

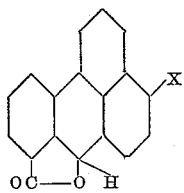

wherein X stands for hydrogen or methyl, the said products which are not capable of forming vats, being crystalline bodies with fixed melting points and soluble in sulfuric acid to fluorescent solutions.

8. As a new product, the compound of the following probable formula:

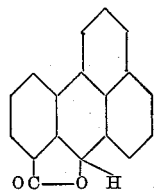

which product, forming almost colorless crystals and being soluble in sulfuric acid to a fluorescent solution is not capable of forming a vat.

9. The process which comprises treating a compound of the general formula:

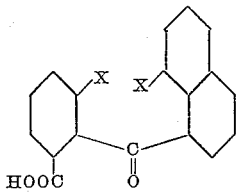

wherein X represents hydrogen and wherein the aromatic nuclei may be substituted with aluminium chloride at a temperature of from about 80° C. to 120° C.

10. The process which comprises treating a compound of the general formula:

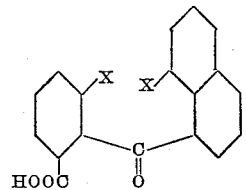

wherein X represents hydrogen and wherein the aromatic nuclei may be substituted with aluminium chloride at a temperature of from about 80° C. to 120° C. and subjecting the condensation product to the action of caustic alkali at a temperature of from about 200° C. to about 300° C.

11. As new products the compounds of the following general formula:

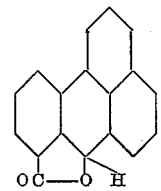

wherein the benzanthrone nucleus may be substituted, the said products being incapable of forming a vat with alkaline hydrosulfite solutions.

In testimony whereof, we affix our signatures.

ARTHUR WOLFRAM.
EMIL HAUSDÖRFER.

CERTIFICATE OF CORRECTION.

Patent No. 1,818,025.             Granted August 11, 1931, to

ARTHUR WOLFRAM ET AL.

It is hereby certified that the State of Incorporation of the assignee in the above numbered patent was erroneously given as "New York", whereas said State should have been given as Delaware, as shown by the records of assignments in this office; and that the said Letters Patent should be read with this correction therein that the same may conform to the record of the case in the Patent Office.

Signed and sealed this 29th day of September, A. D. 1931.

(Seal)

M. J. Moore,
Acting Commissioner of Patents.